Patented Oct. 14, 1924.

1,511,984

UNITED STATES PATENT OFFICE.

ELLWOOD B. SPEAR, OF AKRON, OHIO, ASSIGNOR TO THE GOODYEAR TIRE & RUBBER COMPANY, OF AKRON, OHIO, A CORPORATION OF OHIO.

METHOD OF TREATING RUBBER.

No Drawing.    Application filed January 5, 1923.   Serial No. 610,905.

*To all whom it may concern:*

Be it known that I, ELLWOOD B. SPEAR, a citizen of the United States, and resident of Akron, Ohio, have invented new and useful Improvements in Methods of Treating Rubber, of which the following is a specification.

My invention pertains to the manufacture of rubber, and it has particular relation to that step of the manufacturing process known as vulcanization, in which the curing of the rubber is effected.

The object of my invention consists in providing a novel method of introducing into a rubber compound an agent for accelerating the vulcanization thereof.

Heretofore, the vulcanization of rubber has been effected by several methods, one of which consists in mixing the vulcanizing agents with the rubber or rubber compound during the milling process. Another method consists in treating the rubber, after being calendered, by passing it successively through several chambers filled with gaseous vulcanizing agents. In many instances the complete vulcanization requires a considerable period of time, and, in order to speed up the manufacture, it is desirable that means be introduced for accelerating the vulcanization. Heretofore, it has been possible to introduce only solid accelerating agents, which were introduced by milling them into the rubber mix prior to calendering the rubber.

By my invention I have provided a method of introducing a fluid accelerating agent, either a gas or a liquid. Briefly, my invention comprises introducing the accelerating agent in either gaseous or liquid form into a quantity of activated carbon, and permitting it to be adsorbed upon the surface thereof, after which the carbon is milled into the rubber in the usual manner. The addition of the carbon does not ordinarily introduce any foreign or deleterious ingredient, as it is quite frequently employed as a compounding agent and pigment.

Practically any accelerator which occurs in fluid form, or which is soluble, may be incorporated by means of the carbon. At the present time I prefer to saturate the carbon with ammonium-sulphide, which is a very satisfactory accelerator.

The acceleration of the vulcanization may be materially increased by heating the rubber mix, which tends to drive from the carbon any of the accelerating agent which may still remain therein. This results in the complete vulcanization being effected at the time of heating the product.

The term "carbon" or "activated carbon", as herein employed, refers to lamp black, gas black, or any other suitable carbon product regardless of its source.

Although I have disclosed but a single form which my invention may assume and have described in detail but a single application thereof, it will be apparent to those skilled in the art that many modifications and changes may be made therein without departing from the spirit of my invention, or from the scope of the appended claims.

What I claim is:

1. The method of introducing a vulcanization accelerator into a rubber compound which comprises introducing thereinto carbon carrying an accelerating agent.

2. The method of treating rubber which comprises milling thereinto a quantity of activated carbon carrying means for accelerating the vulcanization thereof.

3. The method of treating rubber which comprises milling thereinto a pigment containing means for accelerating the vulcanization thereof.

4. The method of introducing a fluid vulcanization accelerator to a rubber mix which comprises causing the accelerator to be adsorbed on the surface of activated carbon, and milling said carbon into the mix.

5. The method of introducing a fluid accelerating agent to a rubber compound which comprises saturating a quantity of carbon with said fluid and milling said carbon into said compound.

In witness whereof, I have hereunto signed my name in the presence of two subscribing witnesses.

ELLWOOD B. SPEAR.

Witnesses:
  O. E. BEE,
  F. A. LIND.